United States Patent
Sakakihara

(10) Patent No.: US 9,069,074 B2
(45) Date of Patent: Jun. 30, 2015

(54) METHOD OF INFERRING USER' DIRECTION, DIRECTION INFERRING APPARATUS, AND TERMINAL APPARATUS

(75) Inventor: Hironori Sakakihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 369 days.

(21) Appl. No.: 13/426,025

(22) Filed: Mar. 21, 2012

(65) Prior Publication Data

US 2012/0280825 A1 Nov. 8, 2012

(30) Foreign Application Priority Data

May 6, 2011 (JP) ................................ 2011-103806

(51) Int. Cl.
| | | |
|---|---|---|
| G08B 21/00 | (2006.01) | |
| G01S 19/55 | (2010.01) | |
| G01C 21/08 | (2006.01) | |
| G01C 21/20 | (2006.01) | |
| G01S 5/00 | (2006.01) | |
| G01S 5/02 | (2010.01) | |

(52) U.S. Cl.
CPC ................ *G01S 19/55* (2013.01); *G01C 21/08* (2013.01); *G01C 21/20* (2013.01); *G01S 5/0036* (2013.01); *G01S 5/0247* (2013.01)

(58) Field of Classification Search
CPC ............................... G09F 19/12; G06Q 30/02
USPC ........... 340/386.1, 686.6, 944, 686.1, 384.71; 702/150
See application file for complete search history.

(56) References Cited

U.S. PATENT DOCUMENTS

| | | | |
|---|---|---|---|
| 6,101,443 A * | 8/2000 | Kato et al. ..................... | 701/414 |
| 2007/0178911 A1* | 8/2007 | Baumeister et al. ....... | 455/456.1 |

FOREIGN PATENT DOCUMENTS

| | | |
|---|---|---|
| JP | 2002-58057 | 2/2002 |
| JP | 2008-58057 | 2/2002 |
| JP | 2006-118908 | 5/2006 |
| JP | 2006-253888 | 9/2006 |
| JP | 2007-163297 | 6/2007 |
| JP | 2008-39619 | 2/2008 |
| JP | 2008-275330 | 11/2008 |
| JP | 2009-264917 | 11/2009 |
| JP | 2009-264918 | 11/2009 |

OTHER PUBLICATIONS

Lu et al. "A Location Prediction Algorithm for Directional Communication", IEEE document number: 978-1-4244-2202-9/08, 2008.*
Japanese Office Action dated Sep. 24, 2014 in corresponding Japanese Patent Application No. 2011-103806.

* cited by examiner

*Primary Examiner* — Daniel Previl
(74) *Attorney, Agent, or Firm* — Staas & Halsey LLP

(57) ABSTRACT

A method of inferring a user's direction by a computer, the method includes: recording a relative azimuth angle obtained from an output of a direction sensor included in a terminal apparatus carried by the user; identifying the user's direction at a first point at which the user's direction is capable of being identified; and inferring the user's direction at a second point by using a relative azimuth angle corresponding to the first point and a relative azimuth angle corresponding to the second point different from the first point, and the user's direction that has been identified at the first point.

5 Claims, 8 Drawing Sheets

FIG. 3

| TERMINAL ID | DATE AND TIME OF DETECTION | ACCELERATION |
|---|---|---|
| 0001 | DECEMBER 1, 2010 12:00:05 | $a_{x3}, a_{y3}, a_{z3}$ |
| 0001 | DECEMBER 1, 2010 12:00:00 | $a_{x2}, a_{y2}, a_{z2}$ |
| 0001 | DECEMBER 1, 2010 11:59:55 | $a_{x1}, a_{y1}, a_{z1}$ |
| ... | ... | ... |

FIG. 4

| TERMINAL ID | DATE AND TIME OF DETECTION | ANGULAR VELOCITY (rad/s) | RELATIVE AZIMUTH ANGLE (DEGREES) |
|---|---|---|---|
| 0001 | DECEMBER 1, 2010 12:00:05 | $\omega_{x3}, \omega_{y3}, \omega_{z3}$ | $d_3$ |
| 0001 | DECEMBER 1, 2010 12:00:00 | $\omega_{x2}, \omega_{y2}, \omega_{z2}$ | $d_2$ |
| 0001 | DECEMBER 1, 2010 11:59:55 | $\omega_{x1}, \omega_{y1}, \omega_{z1}$ | $d_1$ |
| ... | ... | ... | ... |

FIG. 5

| TERMINAL ID | DATE AND TIME OF READING | POSITION ID | STAYING TIME |
|---|---|---|---|
| 0001 | DECEMBER 1, 2010 12:00:00 | 1000 | 3 |
| 0001 | DECEMBER 1, 2010 11:50:00 | 0900 | 0.1 |
| 0001 | DECEMBER 1, 2010 11:49:00 | 0800 | 0.1 |
| ... | ... | ... | ... |

FIG. 6

| POSITION ID | PLACE | DIRECTION IDENTIFYING CONDITION | ABSOLUTE DIRECTION | ATTACHED R/W |
|---|---|---|---|---|
| 1000 | PLATFORM | ACCELERATION OF GRAVITY | SOUTH | 20A 20B 20C 20D |
| 0900 | DESCENDING PORT OF ESCALATOR | TERMINAL ID READING | EAST | 20M |
| ... | ... | ... | ... | ... |

FIG. 7

| TERMINAL ID | POSITION ID | READING R/W | USER'S DIRECTION | STAYING TIME |
|---|---|---|---|---|
| 0001 | 1000 | 20C | 10 DEGREES EAST OF NORTH | MARCH 10, 2011 11:00:00 TO MARCH 10, 2011 11:03:00 |
| ... | ... | ... | ... | ... |

US 9,069,074 B2

METHOD OF INFERRING USER' DIRECTION, DIRECTION INFERRING APPARATUS, AND TERMINAL APPARATUS

CROSS-REFERENCE TO RELATED APPLICATION

This application is based upon and claims the benefit of priority of the prior Japanese Patent Application No. 2011-103806, filed on May 6, 2011, the entire contents of which are incorporated herein by reference.

FIELD

The present invention relates to a method of inferring user' direction, a direction inferring apparatus, and a terminal apparatus.

BACKGROUND

To infer the behavior of a user, known technology uses outputs supplied from various types of sensors installed in a terminal apparatus carried by a user. For example, the current position of the user may thereby be located from positional information collected by a global positioning system (GPS) receiver, a motion sensor, or a radio frequency identification (RFID) tag. In another example, a travel track of the user may be identified by storing positional information in time series.

In addition to the above technology to infer the current position or travel track of the user, there is also technology that infers a direction of the user. An example of the technology that infers the direction of the user is a pedestrian navigation method that indicates a route to a destination or guides the pedestrian along the route according to the current position and direction of the pedestrian. This pedestrian navigation method hypothesizes the direction of the back or top of the mobile telephone as the direction of the pedestrian, assuming a situation in which the pedestrian manipulates a mobile telephone or views a display while holding the mobile telephone with a hand. Under this hypothesis, a pedestrian navigation server displays, on the mobile telephone, the direction toward and distance to the destination with respect to the current position, assuming that the mobile telephone direction measured by a magnetic direction sensor is an upward direction.

User's behavior inferred as described above is used for the user to navigate.

However, the above conventional technology infers the direction of the pedestrian only in a limited situation in which a route is indicated to the pedestrian or the pedestrian is guided along the route; the direction of the user may be inferred only when a relationship between the user and the terminal apparatus is known.

The mobile telephone is not used by the user at all times, or rather the mobile telephone is generally carried in a state in which the mobile telephone is stored in a bag, a pocket of clothes, or the like. When the mobile telephone is carried while in a bag or a pocket of clothes, the hypothesis in the above pedestrian navigation method that the pedestrian manipulates the mobile telephone or views a display while holding the mobile telephone with a hand does not hold. Thus, in the above pedestrian navigation method, the direction of the user may be inferred only when the relationship between the user and the terminal apparatus is known. For example, the terminal apparatus may also be used in monitoring to collect information about advertisements in which the user was interested during a travel. When a relationship between the user and the terminal apparatus is unknown, then it becomes hard to use the terminal apparatus to collect user's interest in advertisements. Japanese Laid-open Patent Publication No. 2002-58057 is an example of related art.

SUMMARY

According to an aspect of the invention, a method of inferring a user's direction by a computer, the method includes: recording a relative azimuth angle obtained from an output of a direction sensor included in a terminal apparatus carried by the user; identifying the user's direction at a first point at which the user's direction is capable of being identified; and inferring the user's direction at a second point by using a relative azimuth angle corresponding to the first point and a relative azimuth angle corresponding to the second point different from the first point, and the user's direction that has been identified at the first point.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates an example of the structure of acceleration data.

FIG. 4 illustrates an example of the structure of relative azimuth angle data.

FIG. 5 illustrates an example of the structure of passage history data.

FIG. 6 illustrates an example of the structure of direction data.

FIG. 7 illustrates an example of inferred result data.

DESCRIPTION OF EMBODIMENTS

Embodiments of a direction inferring method and a direction inferring apparatus disclosed in the present disclosure will be described in detail with reference to the drawings. These embodiments do not limit the disclosed technology and may be appropriately combined together if a conflict does not occur between processes.

First Embodiment

System Structure

Figure 1:
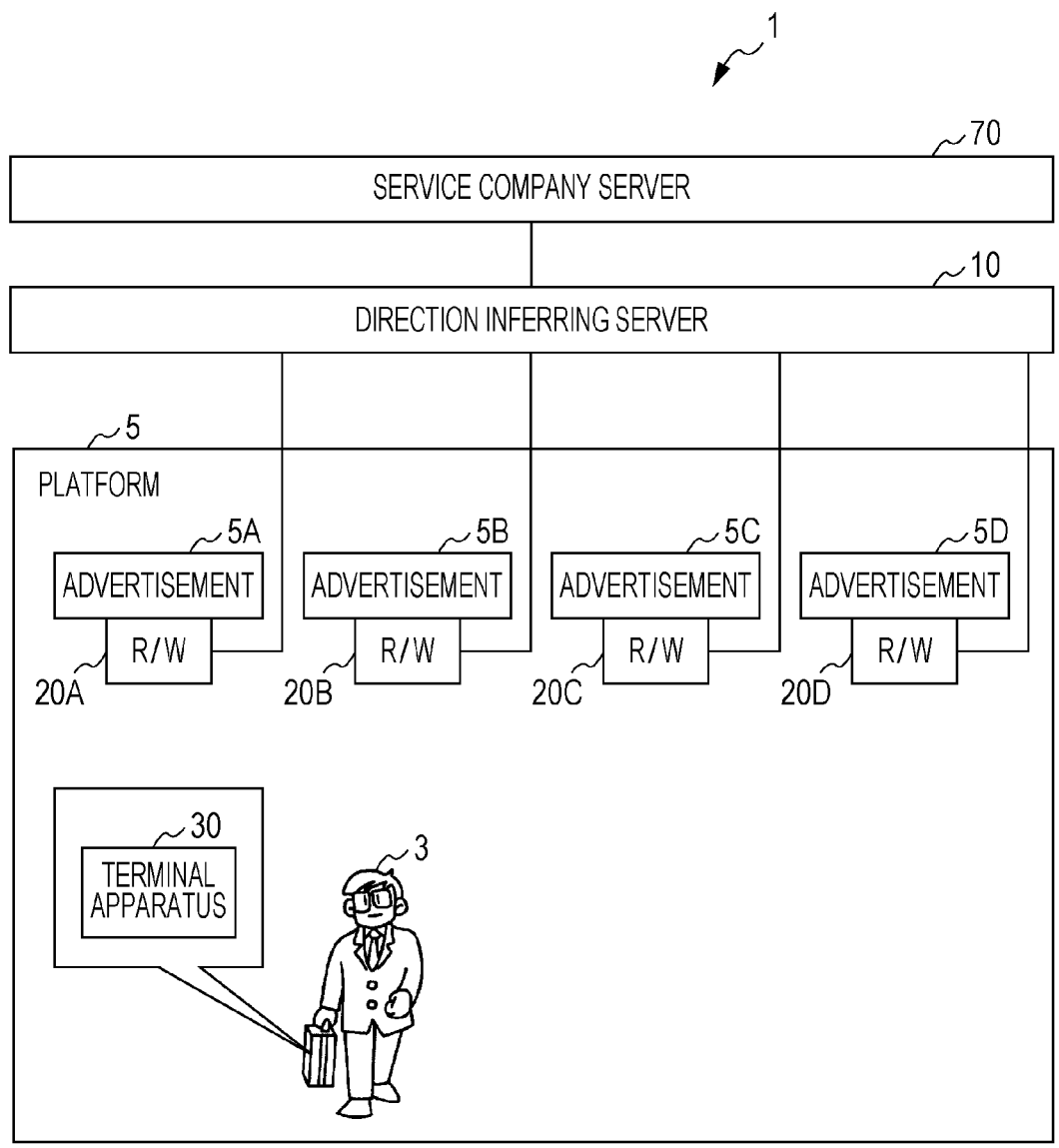
FIG. 1 illustrates the structure of a direction inference system according to a first embodiment.

First, the structure of a direction inferring system according to a first embodiment will be described. FIG. 1 illustrates the structure of the direction inference system 1 according to the first embodiment. The direction inference system 1 in FIG. 1 includes a direction inferring server 10, read/write units 20A to 20D, a terminal apparatus 30, and a service company server 70. The example in FIG. 1 assumes a case in which, when one of the read/write units 20A to 20D detects that a user 3 carrying the terminal apparatus 30 has approached a relevant advertisement 5A, 5B, 5C, or 5D installed at a platform 5, the direction of the user 3 is inferred.

A network is connected between the read/writes units 20A to 20D and the direction inferring server 10 and between the service company server 70 and the direction inferring server 10 so that communication is possible therebetween. Examples of the network include the Internet, a local area network (LAN), a virtual private network (VPN), and other communication networks, regardless of whether the network is a wired or wireless network. The terminal apparatus 30 and direction inferring server 10 are interconnected by, for example, a mobile telephone network so that communication is possible. In the description below, the read/writes units 20A to 20D may be collectively referred to as the read/write units 20 when they are not differentiated, and the advertisements 5A and 5D may be collectively referred to as the advertisements 5 when they are not differentiated.

Each read/write unit 20 communicates with an IC tag (integrated circuit) 31 incorporated into the terminal apparatus 30 described later to read out information recorded in the IC tag 31 or writes information into the IC tag 31. The read/write unit 20 emits an electromagnetic wave, the effective communication distance of which is stipulated in the specifications for close-coupled cards, proximity cards, or vicinity cards. These electromagnetic waves are used to generate electric power from a coiled antenna incorporated into the IC tag 31 of the terminal apparatus 30, enabling data communication. The read/write unit 20 then reads out information recorded in the IC tag 31 of the terminal apparatus 30 (an example of the information is terminal identification (ID), which identifies the terminal apparatus 30), and sends the read terminal ID to the direction inferring server 10 together with a position ID, which identifies the position at which the read/write unit 20 is set.

In an example illustrated in FIG. 1, the read/write units 20 are associated with the advertisements 5A to 5D on the platform 5 on a one-to-one basis. When any one of the read/write units 20A to 20D reads a terminal ID, therefore, it may be detected that the user 3 carrying the terminal apparatus 30 has approached the advertisement 5 to which the read/write unit 20 that has read the terminal ID is attached. Although the four advertisements 5A to 5D are installed in the example in FIG. 1, the disclosed system may be applied to cases in which any number of advertisements 5, including a single advertisement 5, is installed. Although the read/write units 20 in FIG. 1 are in one-to-one correspondence with the advertisements 5A to 5D, one read/write unit 20 may be associated with a plurality of advertisements 5.

The terminal apparatus 30 is an information processing unit carried by the user 3. Examples of the terminal apparatus 30 include smart phones, personal handyphone systems (PHS), and personal digital assistants (PDAs). The example in FIG. 1 assumes that the terminal apparatus 30 stored in the bag of the user 3 is carried, but this is not a limitation to the method of carrying the terminal apparatus 30. That is, the method of carrying the terminal apparatus 30 in the disclosed system is not limited to one hypothesis; the method of inferring the direction of the user, the method being described later, may also be similarly applied to cases in which the terminal apparatus 30 is carried in other states in which, for example, the terminal apparatus 30 is stored in a pocket. Although, in the example in FIG. 1, only one terminal apparatus 30 is used, this is not a limitation; a plurality of terminal apparatuses 30 may be used in the disclosed system.

The terminal apparatus 30 includes the IC tag 31, described later, by which the terminal ID of the terminal apparatus 30 and other data is sent to the read/write unit 20. The terminal apparatus 30 further includes motion sensor 33 described later, and uploads a sensor value output by the motion sensor 33 to the direction inferring server 10. Examples of the motion sensor 33 include an acceleration sensor 33A and an angular velocity sensor 33B, which are described later. The terminal apparatus 30 not only may send outputs of the motion sensor 33 in succession, but also may send sensor values accumulated during a fixed period at one time to suppress communication traffic.

Although, in this example, the terminal apparatus 30 includes the IC tag 31 and motion sensor 33, the disclosed 30 may also include various types of sensors other than theses sensors. For example, the disclosed terminal apparatus 30 may use a compass sensor, which measures an absolute direction, instead of the angular velocity sensor 33B, which measures a relative azimuth angle, or may use both the angular velocity sensor 33B and the compass sensor. Furthermore, the disclosed terminal apparatus 30 may use a global positioning system (GPS) sensor as a sensor that may detect the position of the terminal apparatus 30 instead of the IC tag 31, and may use both the terminal apparatus 30 and the GPS sensor. In this embodiment, a three-axis motion sensor, a three-axis compass sensor, or the history of the three-axis motion sensor or three-axis compass sensor may be used to identify the perpendicular direction or a horizontal plane relative to the ground. Thus, in this embodiment, the posture of the terminal apparatus 30 may be inferred. The relative azimuth angle used in this embodiment is the relative azimuth angle on this inferred horizontal plane.

The direction inferring server 10 is a computer that provides a service by which the direction of the user 3 that has approached one of the advertisements 5A to 5D installed on the platform 5 may be inferred. For example, when the direction inferring server 10 receives a position ID and terminal ID from one of the read/write units 20A to 20D attached to the advertisements 5A to 5D, the direction inferring server 10 infers the direction of the user 3 carrying the terminal apparatus 30 in the vicinity of the relevant advertisement 5. The direction inferring server 10 then sends the position ID of the advertisement 5, a date and time, the direction of the user 3, and other inferred results to the service company server 70.

The direction inferring server 10 according to this embodiment records the relative azimuth angle obtained from an output supplied from the angular velocity sensor 33B included in the terminal apparatus 30 carried by the user 3. The direction inferring server 10 according to this embodiment further identifies the direction of the user 3 at a first point at which the direction of the user 3 may be identified. The direction inferring server 10 according to this embodiment then uses the recorded relative azimuth angle corresponding to the first point, a relative azimuth angle at a second point, which is different from the first point, and the direction of the user 3 that has been identified at the first point to infer the direction of the user 3 at the second point.

As described above, the direction inferring server 10 according to this embodiment uses the direction, which may be known by heuristics, of the user 3 at the first point to identify the direction of the user 3 at the second point, which is the location of the advertisement 5 that the user 3 has approached. Therefore, the direction inferring server 10 according to this embodiment may infer the direction of the user 3 at the second point by performing an operation on the relative azimuth angle corresponding to the first point and the relative azimuth angle at the second point, without limiting the relationship between the user 3 and the terminal apparatus 30 to a particular positional relationship.

Accordingly, even if the relationship between the user 3 and the terminal apparatus 30 is unknown, the direction inferring server 10 according to this embodiment may infer the direction of the user 3 at the second point. In addition, the direction inferring server 10 according to this embodiment may infer the direction of the user 3 at less cost than when a camera attached to the advertisement 5 is used to infer the direction of the user 3.

The service company server 70 is a computer operated by a company that supplies various services related to the advertisements 5. For example, the service company server 70 identifies the user 3 that has faced the advertisement 5, that is, the user 3 that has had an interest in the advertisement 5 from the inferred results received from the direction inferring server 10. In another example, the service company server 70 analyzes the effect of the advertisements 5 by indicating, on a map, the directions of the users 3 that have passed by the advertisements 5 or by counting the number of users 3 that have had an interest in the advertisements 5. In another example, the service company server 70 sends mail indicating services related to the advertisements 5 to the users 3 that have had an interest in the advertisements 5.

Structure of the Terminal Apparatus 30

Figure 2:
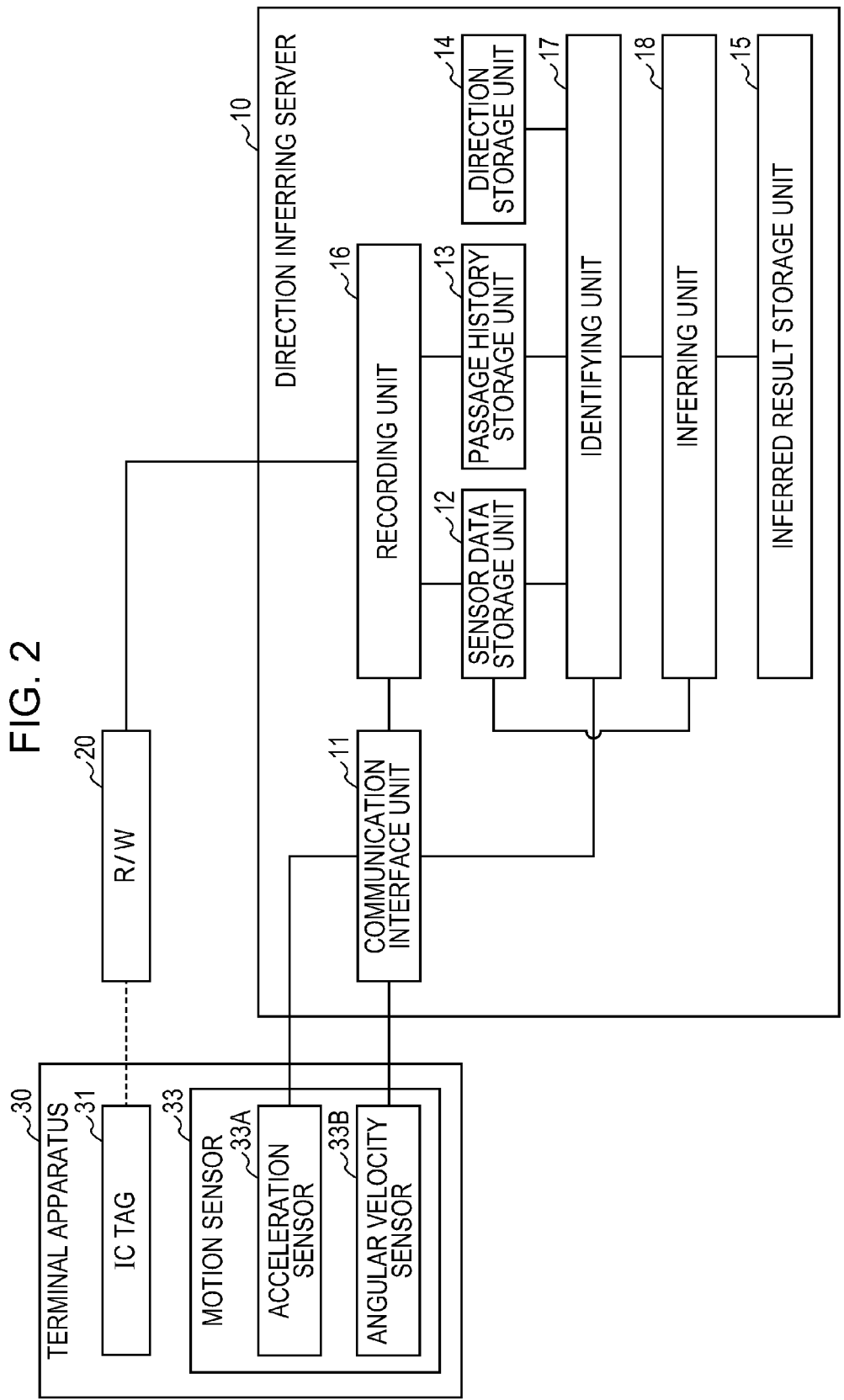
FIG. 2 is a block diagram illustrating the structures of apparatuses included in the direction inference system according to the first embodiment.

Next, the functional structure of the terminal apparatus 30 according to this embodiment will be described. FIG. 2 is a block diagram illustrating the structures of apparatuses included in the direction inference system 1 according to the first embodiment. As illustrated in FIG. 2, the terminal apparatus 30 includes the IC tag 31 and motion sensor 33. In addition to the functional units illustrated in FIG. 2, the terminal apparatus 30 includes various other types of functional units included in known terminal apparatuses, such as, for example, various input devices and voice output devices as well as functional units that execute communication through a carrier and functional units that execute application programs.

The IC tag 31 is an RFID tag incorporating an IC chip and a coiled antenna. For example, upon receipt of an electromagnetic wave emitted from the read/write unit 20, the IC tag 31 generates electric power from the coiled antenna, and uses the electric power to send information recorded in the IC chip (the terminal ID, for example) to the read/write unit 20. Any identifier such as the telephone number of the terminal apparatus 30 or the ID number of a subscriber identity module (SIM) card may be used as the terminal ID.

The motion sensor 33 measures the motion of the terminal apparatus 30. The motion sensor 33 includes the acceleration sensor 33A and angular velocity sensor 33B as illustrated in FIG. 2. Although the example in FIG. 2 illustrates a case in which the acceleration sensor 33A and angular velocity sensor 33B are included, the motion sensor 33 is not limited to two sensors; the motion sensor 33 may further include a compass sensor and a velocity sensor.

The acceleration sensor 33A measures the acceleration of the terminal apparatus 30. Examples of the acceleration sensor 33A include a three-axis acceleration sensor, which measures acceleration in the X-axis direction, Y-axis direction, and Z-axis direction. Sensor values in the three-axis directions, measured by the acceleration sensor 33A, are converted into digital values by an analog-to-digital converter (not illustrated), after which the converted digital values are sent to the direction inferring server 10. The method of measuring the acceleration may be a semiconductor-based method, a mechanical method, an optical method, or any another method.

The angular velocity sensor 33B measures the angular velocity of the terminal apparatus 30. Examples of the angular velocity sensor 33B include a three-axis gyroscope that measures accelerations around the X-axis, Y, axis, and Z-axis. Sensor values around the three axes, measured by the angular velocity sensor 33B, are converted into digital values by an analog-to-digital converter (not illustrated), after which the converted digital values are sent to the direction inferring server 10. The method of measuring the angular velocity may be of a vibration type, a rotational type, or any other type.

Structure of the Direction Inferring Server 10

Next, the functional structure of the direction inferring server 10 according to this embodiment will be described. As illustrated in FIG. 2, the direction inferring server 10 includes a communication interface unit 11, a sensor data storage unit 12, a passage history storage unit 13, a direction storage unit 14, an inferred result storage unit 15, a recording unit 16, an identifying unit 17, and an inferring unit 18. In addition to the functional units illustrated in FIG. 2, the direction inferring server 10 includes various types of functional units included in known computers, such as, for example, various input devices and voice output devices.

The communication interface unit 11 controls communication with other apparatuses such as the read/write units 20 and service company server 70. In an example, the communication interface unit 11 receives the position ID and terminal ID from the read/write unit 20 and also receives sensor values of the motion sensor 33 from the terminal apparatus 30. In another example, the communication interface unit 11 sends an inferred result indicating the direction of the user 3, which is inferred by the inferring unit 18 described later, to the service company server 70. Examples of the communication interface unit 11 include a network interface card (NIC) such as a LAN card and a modem.

The sensor data storage unit 12 stores data measured by the motion sensor 33. In an example, the recording unit 16 described later records, in the sensor data storage unit 12, the acceleration and angular velocity, which have been respectively received from the acceleration sensor 33A and angular velocity sensor 33B in the terminal apparatus 30, as well as a relative azimuth angle obtained by applying time integration to the angular velocity. In another example, the sensor data storage unit 12 is referenced by the identifying unit 17 described later to identify a time at which the user 3 has passed the first point at which the direction of the user 3 may be identified. In another example, the sensor data storage unit 12 is referenced by the inferring unit 18 described later to infer the direction of the user 3 at a point at which the terminal ID has been read by the read/write unit 20.

As an aspect of the sensor data storage unit 12, acceleration data, in which a terminal ID, a time of detection, and acceleration are mutually associated, is stored in time series. The time of detection is a time at which acceleration was detected by the acceleration sensor 33A. FIG. 3 illustrates an example of the structure of the acceleration data. All records in the example in FIG. 3 indicate the acceleration data of the terminal apparatus 30 having a terminal ID of 0001. As illustrated in FIG. 3, acceleration $(a_{x1}, a_{y1}, a_{z1})$ was measured at Dec. 1, 2010 11:59:55, acceleration $(a_{x2}, a_{y2}, a_{z2})$ was measured at 12:00:00 on that day, and acceleration $(a_{x3}, a_{y3}, a_{z3})$ was measured at 12:00:05 on that day. In the example in FIG. 3, the acceleration data of the terminal apparatus 30 having the terminal ID 0001 is illustrated; in practice, however, the acceleration data of terminal apparatuses 30 having other terminal IDs are stored together.

In another aspect of the sensor data storage unit 12, relative azimuth angle data, in which a terminal ID, a time of detection, an angular velocity, and a relative azimuth angle are mutually associated, is stored in time series. The time of detection is the time at which the angular velocity was collected by the angular velocity sensor 33B. The relative azimuth angle is an angle through which the terminal apparatus 30 was relatively moved from the direction of the terminal apparatus 30 in an initial state, for example, the direction at which the terminal apparatus 30 starts to collect sensor values. The relative azimuth angle is derived when the angular velocity around the Z axis is time-integrated by the recording unit 16 described later.

FIG. 4 illustrates an example of the structure of the relative azimuth angle data. All records in the example in FIG. 4 indicate the relative azimuth angle data of the terminal apparatus 30 having the terminal ID 0001. As illustrated in FIG. 4, an angular velocity ($\overline{\omega}_{x1}$, $\overline{\omega}_{y1}$, $\overline{\omega}_{z1}$) was measured at Dec. 1, 2010 11:59:55, an angular velocity ($\overline{\omega}_{x2}$, $\overline{\omega}_{y2}$, $\overline{\omega}_{z2}$) was measured at 12:00:00 on that day, and an angular velocity ($\overline{\omega}_{x3}$, $\overline{\omega}_{y3}$, $\overline{\omega}_{z3}$) was measured at 12:00:05 on that day. In addition, a relative azimuth angle d1 was measured at Dec. 1, 2010 11:59:55, a relative azimuth angle d2 was measured at 12:00:00 on that day, and a relative azimuth angle d3 was measured at 12:00:05 on that day. In the example in FIG. 4, the relative azimuth angle data of the terminal apparatus 30 having the terminal ID 0001 is illustrated; in practice, however, the relative azimuth angle data of terminal apparatuses 30 having other terminal IDs are stored together.

The passage history storage unit 13 stores a history of records indicating that the user 3 passed the vicinity of the platform 5. For example, when the terminal ID of the terminal apparatus 30 that the user 3 carries is read by the read/write unit 20 attached to the advertisement 5, passage history data is stored in the passage history storage unit 13 by the recording unit 16 described later.

As an aspect of the passage history storage unit 13, passage history data, in which a terminal ID, a read time, a position ID, and a staying time are mutually associated, may be collected. The read time is a time at which the terminal ID of the terminal apparatus 30 was read by the read/write unit 20. The staying time is a duration during which the user 3 stayed in the vicinity of the advertisement 5; a duration from which the terminal ID of the terminal apparatus 30 is read by the read/write unit 20 until the reading of the terminal ID becomes impossible is stored as the staying time by the recording unit 16.

FIG. 5 illustrates an example of the structure of the passage history data. All records in the example in FIG. 5 indicate the passage history data of the user 3 carrying the terminal apparatus 30 having the terminal ID 0001. The example in FIG. 5 indicates that the user 3 passed the point identified by a position ID of 0800 at Dec. 1, 2010 11:49:00 and that the user 3 stayed the point identified by the position ID 0800 for 0.1 minute. The example in FIG. 5 further indicates that the user 3 passed the point identified by a position ID of 0900 at 11:50:00 on that day and that the user 3 stayed the position identified by the position ID 0900 for 0.1 minute. The example in FIG. 5 further indicates that the user 3 passed the point identified by a position ID of 1000 at 12:00:00 on that day and that the user 3 stayed the position identified by the position ID 1000 for three minutes. In the example in FIG. 5, the passage history data of the terminal apparatus 30 having the terminal ID 0001 is illustrated; in practice, however, the passage history data of terminal apparatuses 30 having other terminal IDs are stored together.

The direction storage unit 14 stores direction identifying conditions, each of which is associated with an absolute direction in which the user 3 is identified as facing when the direction identifying condition is met. As an aspect of the direction storage unit 14, direction data, in which a position ID, a place, an direction identifying condition, an absolute direction, and an attached read/write unit are mutually associated may be collected. The direction identifying condition refers to a condition that is met to identify the direction of the user 3; for example, a condition is defined under which possible directions of the user 3 may be reduced to one by heuristics. The attached read/write unit refers to the read/write unit 20 attached to a place to which the direction identifying condition is applied. The attached read/write unit may refer to a plurality of attached read/write units.

FIG. 6 illustrates an example of the structure of the direction data. In the example in FIG. 6, the direction identifying condition that acceleration of gravity equal to or more than a prescribed threshold is detected after a terminal ID is detected by any of the read/write unit 20A, read/write unit 20B, read/write unit 20C, or read/write unit 20D is set for the platform having the position ID 1000. This setting is based on the heuristics that when a person gets on an electric train, the acceleration of gravity at a time when the person steps over the spacing between the platform and an entrance/exit port of the electric train is larger than while the person is walking. The absolute direction identified in this case is the direction in which the person moves from the platform to the front of the entrance/exit port of the electric train, that is, the south in the example in FIG. 6. If the direction identifying condition is met, a point at which acceleration of gravity becomes equal to or more than the prescribed threshold is assumed to the first point. The identifying unit 17 described later then identifies the absolute direction in which the user 3 faces at the first point as the south.

In the example in FIG. 6, the direction identifying condition that a terminal ID is read by a read/write unit 20M is set for the descending port of the escalator at the position having the position ID 0900. This setting is based on the heuristics that when a person gets off an escalator, the person faces the front. The absolute direction identified in this case is the direction toward the front of the descending port of the escalator, that is, the east in the example in FIG. 6. If the direction identifying condition is met, the point at which the terminal ID was read by the read/write unit 20M is assumed to the first point. The identifying unit 17 then identifies the absolute direction in which the user 3 faces at the first point as the east.

The inferred result storage unit 15 stores inferred results of the direction, of the user 3, that has been inferred by the inferring unit 18 described later. As an aspect of the inferred result storage unit 15, inferred result data, in which a terminal ID, a place ID, a reading read/write unit, the direction of the user 3, and a staying time are mutually associated may be collected. The reading read/write unit refers to the read/write unit 20, attached to the advertisement 5, that has read the terminal ID. The inferred result data is sent to the service company server 70 by the inferring unit 18 described later.

FIG. 7 illustrates an example of the inferred result data. The example in FIG. 7 indicates that the terminal ID 0001 of the terminal apparatus 30 has been read by the read/write unit 20C attached to the advertisement 5C of the advertisements 5 attached to the platform 5 having the position ID 1000. Specifically, the example indicates that the user 3 carrying the terminal apparatus 30 having the terminal ID 0001 stayed in the vicinity of the advertisement 5C during a duration of Mar.

10, 2011 11:00:00 to 11:03:00 while facing in a direction 10 degrees east of north. Although, in the example in FIG. 7, the direction of the user 3 is represented by an angle relative to the north, this is not a limitation; the direction of the user 3 may be represented by an angle relative to a desired direction. The disclosed direction inferring server 10 may also represent the direction of the user 3 relative to a landmark at a place where the direction of the user 3 has been inferred.

Semiconductor memory devices and storage units may be used as the sensor data storage unit 12, passage history storage unit 13, direction storage unit 14, and inferred result storage unit 15. Examples of the semiconductor memory devices include video random access memories (VRAMs), random access memories (RAMs), read-only memories (ROMs), and flash memories. Examples of the storage units include hard disk drives and optical disk drives.

The recording unit 16 is a processing unit that controls the recording of data. As an aspect, when the recording unit 16 receives a detection time and acceleration from the acceleration sensor 33A of the terminal apparatus 30, the recording unit 16 records, in the sensor data storage unit 12, acceleration data in which the terminal ID of the sending terminal apparatus 30 is associated with the detection time and acceleration. When the recording unit 16 receives a detection time and an angular velocity from the angular velocity sensor 33B of the terminal apparatus 30, the recording unit 16 carries out time-integration between the angular velocity and the angular velocities that have been received so far to calculate an angle through which the user 3 has moved from the direction in the initial state, that is, a relative azimuth angle. The recording unit 16 then records, in the sensor data storage unit 12, relative azimuth angle data in which the terminal ID of the sending terminal apparatus 30 is associated with the time of detection, the angular velocity, and the relative azimuth angle. The recording unit 16 may set desired frequencies at which the acceleration sensor 33A notifies the recording unit 16 of acceleration and the angular velocity sensor 33B notifies the recording unit 16 of the angular velocity.

As another aspect, when the recording unit 16 receives a position ID, a terminal ID, and a time of reading from the read/write unit 20, the recording unit 16 records, in the passage history storage unit 13, passage history data in which the position ID, the terminal ID, and the time of reading are mutually associated. At that time, the recording unit 16 measures a duration from which a notification of the position ID, the terminal ID, and the time of reading from the read/write unit 20 starts until the notification is completed, and adds the measured duration to the passage history data.

The identifying unit 17 is a processing unit that identifies the direction of the user 3 at the first point at which the direction of the user 3 may be identified. As an aspect, when the read/write unit 20 notifies the identifying unit 17 of a position ID, a terminal ID, and a time of reading, the identifying unit 17 activates a process to read out a direction identifying condition corresponding to the sending read/write unit 20, the direction identifying condition being part of the direction identifying conditions stored in the direction storage unit 14. When the direction identifying condition is "terminal ID reading", the identifying unit 17 sets a time T0 at which the terminal ID was read as a direction identifying time T1. The reason why the terminal ID read time T0 is set as the direction identifying time T1 is that the direction identifying condition that the point at which the terminal ID is read by the read/write unit 20 is assumed to be the first point is set. When the direction identifying condition is "acceleration of gravity", the identifying unit 17 sets the time at which acceleration of gravity equal to or more than the prescribed threshold was detected after the terminal ID was detected by the read/write unit 20 as the direction identifying time T1, with reference to the acceleration data stored in the sensor data storage unit 12. The identifying unit 17 then references the direction storage unit 14 and identifies the absolute direction at the point at which the applied direction identifying condition is met as the direction of the user 3 at the first point.

Accordingly, when the direction identifying time T1 has been set, a relative azimuth angle $\theta_1$ at the first point, which is part of the relative azimuth angle data, may be called in a subsequent process. Although, in this example, time has been used as an index to call the relative azimuth angle $\theta_1$ at the first point, any data linked to the relative azimuth angle, such as, for example, the number of steps counted from a prescribed position taken as an origin may be used as the index.

The inferring unit 18 is a processing unit that infers the direction of the user 3 at the second point at which the terminal ID was read by using the relative azimuth angle corresponding to the first point, the relative azimuth angle at the second point, and the direction of the user 3 identified at the first point.

As an aspect, the inferring unit 18 infers the direction of the user 3 at the second point, assuming that the terminal apparatus 30 carried by the user 3 is placed in a bag or pocket and the correlation between the direction of the user 3 and the direction of the terminal apparatus 30 remains unchanged.

This type of inference will be described. First, the inferring unit 18 acquires the direction identifying time T1 identified by the identifying unit 17. The inferring unit 18 then reads out the relative azimuth angle corresponding to the direction identifying time T1, the relative azimuth angle being part of the relative azimuth angles stored in the sensor data storage unit 12 as the relative azimuth angle data. Then, the relative azimuth angle $\theta_1$ at the first point is acquired. The inferring unit 18 subtracts the relative azimuth angle $\theta_1$ at the first point from the direction of the user 3 at the first point to identify a basic axis that indicates a direction inferable as the initial state that the user 3 faces, the terminal apparatus 30 starting to collect sensor values in the initial state. The inferring unit 18 then reads out a relative azimuth angle $\theta_2$ corresponding to the terminal ID read time T0, the relative azimuth angle $\theta_2$ being part of the relative azimuth angles stored in the sensor data storage unit 12 as the relative azimuth angle data. Then, the relative azimuth angle $\theta_2$ at the second point is acquired. Then, the inferring unit 18 adds the relative azimuth angle $\theta_2$ at the second point to the direction used as the basic axis of the user 3, which has been calculated earlier, to infer the direction of the user 3 at the second point. The inferring unit 18 then stores, in the inferred result storage unit 15, inferred result data in which inferred results obtained by the inference are mutually associated, the inferred results including, for example, the direction of the user 3, the terminal ID of the user 3, the position ID of the position at which the advertisement 5 is present, the attached read/write unit, and time during which the user 3 stayed.

Although, in this example, the basic axis of the terminal apparatus 30 has been obtained to infer the direction of the user 3 at the second point, the method of inferring the direction of the user 3 is not limited to this method. For example, the inferring unit 18 may add a difference between the relative azimuth angle $\theta_1$ at the first point and the relative azimuth angle $\theta_2$ at the second point to the direction of the user 3 at the first point to infer the direction of the user 3 at the second point.

Figure 8:
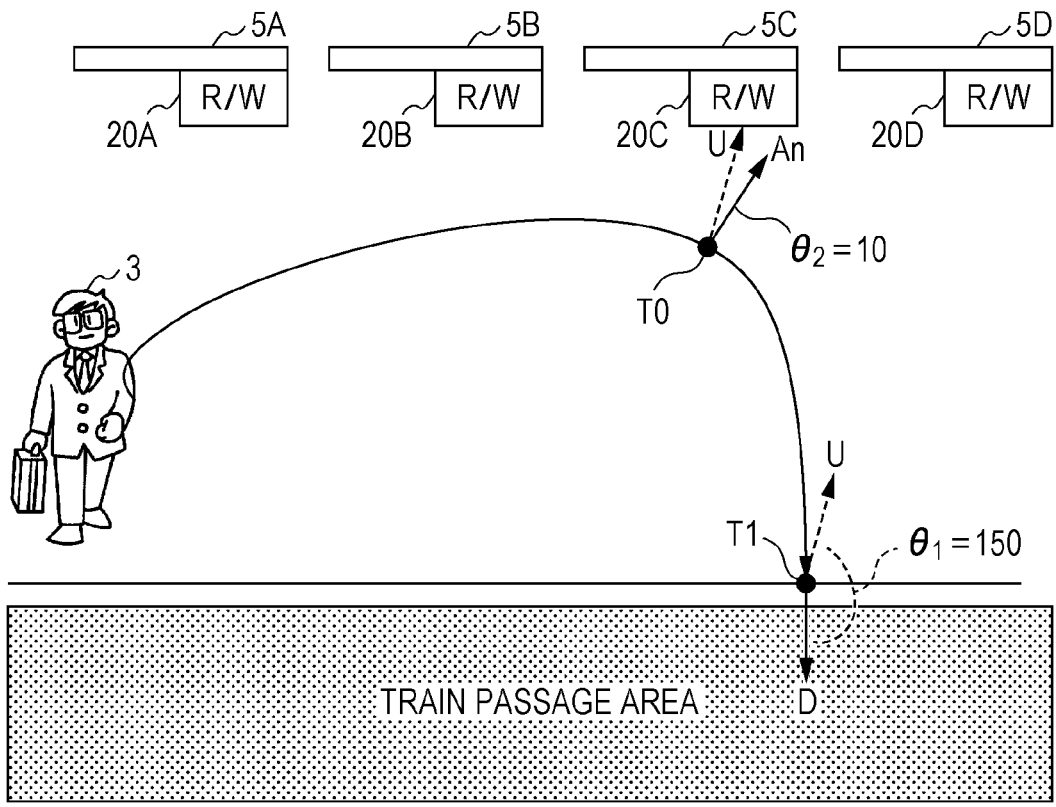
FIG. 8 schematically illustrates a travel trace of a user at a platform.
Figure 9:
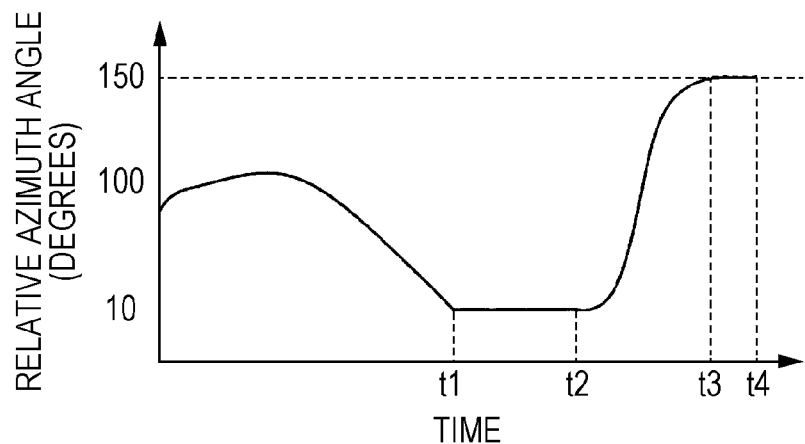
FIG. 9 is a graph illustrating a relationship between relative azimuth angle and time on the travel trace of the user illustrated in FIG. 8.

A specific example to infer the direction of the user 3 will be described with reference to FIGS. 8 and 9. FIG. 8 schematically illustrates a travel trace of the user 3 at the platform 5, and FIG. 9 is a graph illustrating a relationship between relative azimuth angle and time on the travel trace of the user 3 illustrated in FIG. 8. In the example in FIG. 8, the description below assumes that the upward direction is the north, the downward direction is the south, the left direction is the west, and the right direction is the east. The graph in FIG. 9 indicates relative azimuth angle (degrees) on the vertical axis and time (s) on the vertical axis.

As illustrated in FIG. 8, the user 3 passes outside the read range of the read/write unit 20A attached to the advertisement 5A, passes outside the read range of the read/write unit 20B attached to the advertisement 5B, and reaches the read range of the read/write unit 20C attached to the advertisement 5C. When the user 3 reaches the read range of the read/write unit 20C, the read/write unit 20C starts to read the terminal ID of the terminal apparatus 30 that the user 3 carries. The time at which the read/write unit 20C starts to read the terminal ID is assumed to be T0. In this case, as illustrated in FIG. 9, there is no change in the relative azimuth angle between time t1 (=T0) and time t2. This indicates that the user 3 is stopping in front of the advertisement 5C. When time t2 passes, the relative azimuth angle starts to change again as the user 3 moves. The change in the relative azimuth angle stops again at time t3, and acceleration of gravity equal to or more than a threshold is detected at time t4 (=T1).

The identifying unit 17 sets the relative azimuth angle corresponding to time T1, at which acceleration of gravity equal to or more than the threshold was detected, as the relative azimuth angle $\theta_1$ at the first point. As defined by the direction data illustrated in FIG. 6, the identifying unit 17 identifies the absolute direction in which the user 3 faces at the first point as the south, assuming that a point at which acceleration of gravity becomes the threshold or more to be the first point. Then, the inferring unit 18 reads out the relative azimuth angle $\theta_1$ corresponding to the direction identifying time T1, the relative azimuth angle $\theta_1$ being part of the relative azimuth angles stored in the sensor data storage unit 12 as relative azimuth angle data. The relative azimuth angle $\theta_1$ is now assumed to be 150 degrees. The inferring unit 18 subtracts the relative azimuth angle $\theta_1$ at the first point from the direction D of the user 3 at the first point to infer a basic axis U (30 degrees=D−$\theta_1$) of the user 3. The inferring unit 18 then reads out the relative azimuth angle $\theta_2$ corresponding to the terminal ID read time T0, the relative azimuth angle $\theta_2$ being part of the relative azimuth angles stored in the sensor data storage unit 12 as relative azimuth angle data. The relative azimuth angle $\theta_2$ is then assumed to be 10 degrees. The inferring unit 18 adds the relative azimuth angle $\theta_2$ at the second point to the basic axis U of the terminal apparatus 30, which has been calculated earlier, to infer the direction An (40 degrees=U+$\theta_2$) of the user 3 at the second point.

The inferring unit 18 sends the inferred result data stored in the inferred result storage unit 15 to the service company server 70. The inferring unit 18 may also select only inferred result data in which the staying time is equal to or longer than a prescribed duration, as the inferred result data to be sent to the service company server 70.

Various types of integrated circuits and electronic circuits may be used as the recording unit 16, identifying unit 17, and inferring unit 18. Examples of integrated circuits include application-specific integrated circuits (ASICs). Examples of electronic circuits include central processing units (CPUs) and micro processing units (MPUs).

Flow of Processing

Next, flow of the processing executed by the direction inferring server 10 according to this embodiment will be described. An identifying process executed by the identifying unit 17 will be first described in (1) below, and an inferring process executed by the inferring unit 18 is then described in (2) below.

(1) Identifying Process

Figure 10:
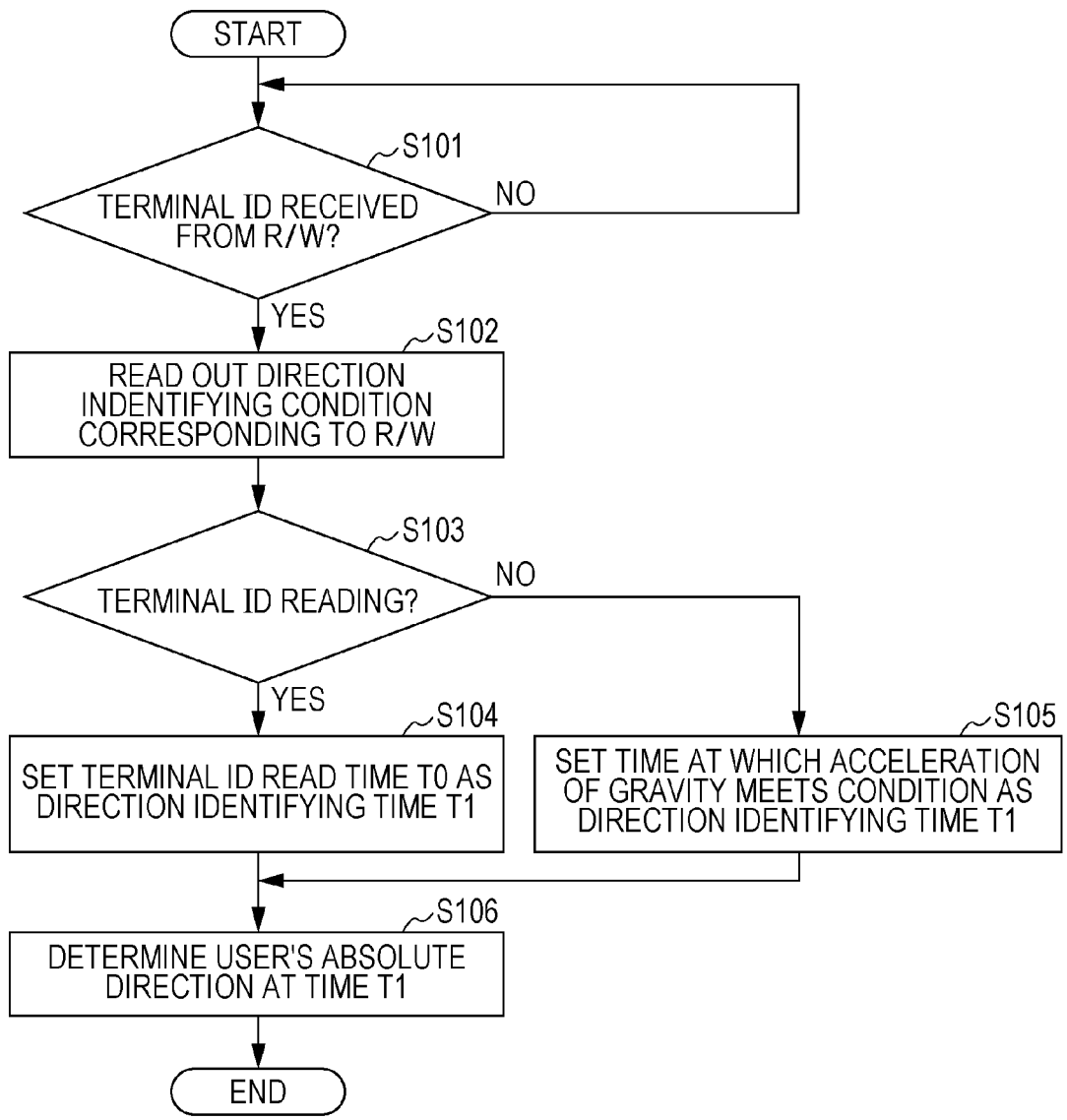
FIG. 10 is a method illustrating a procedure in an identifying process according to the first embodiment.

FIG. 10 is a method illustrating a procedure in the identifying process according to the first embodiment. The identifying process in FIG. 10 is activated when a position ID, a terminal ID, and a read time are received from the read/write unit 20.

As illustrated in FIG. 10, upon receipt of a position ID, a terminal ID, and a read time from the read/write unit 20 (the result in step S101 is Yes), the identifying unit 17 reads out a direction identifying condition corresponding to the sending read/write unit 20, the direction identifying condition being part of the direction identifying conditions stored in the direction storage unit 14 (step S102).

If the direction identifying condition is "terminal ID reading" (the result in step S103 is Yes), the identifying unit 17 sets the time T0 at which the terminal ID was read as the direction identifying time T1 (step S104).

If the direction identifying condition is "acceleration of gravity" (the result in step S103 is No), the identifying unit 17 sets the time at which acceleration of gravity equal to more than the prescribed threshold was detected after the terminal ID was detected by the read/write unit 20 as the direction identifying time T1, with reference to the acceleration data stored in the sensor data storage unit 12 (step S105).

The identifying unit 17 then determines the absolute direction of the user 3 at the direction identifying time T1 with reference to the direction storage unit 14 (step S106), and terminates the process.

(2) Inferring Process

Figure 11:
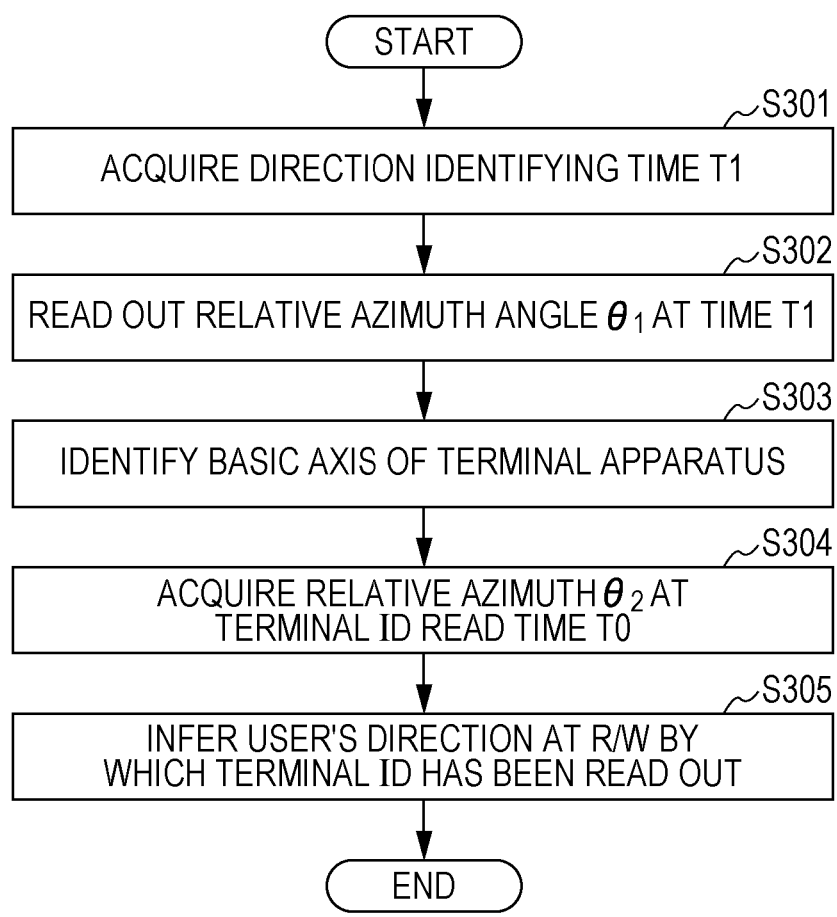
FIG. 11 is a method illustrating a procedure in an inferring process according to the first embodiment.

FIG. 11 is a method illustrating a procedure in the inferring process according to the first embodiment. The inferring process in FIG. 11 is activated when the process in step S106 in FIG. 10 is completed.

As illustrated in FIG. 11, the inferring unit 18 acquires the direction identifying time T1 identified by the identifying unit 17 (step S301). The inferring unit 18 then reads out the relative azimuth angle corresponding to the direction identifying time T1, the relative azimuth angle being part of the relative azimuth angles stored in the sensor data storage unit 12 as the relative azimuth angle data (step S302).

The inferring unit 18 subtracts the relative azimuth angle $\theta_1$ at the first point from the direction of the user 3 at the first point to identify the basic axis that indicates a direction inferable as the initial state that the user 3 faces, the terminal apparatus 30 starting to collect sensor values in the initial state (step S303).

The inferring unit 18 then reads out the relative azimuth angle $\theta_2$ corresponding to the terminal ID read time T0, the relative azimuth angle $\theta_2$ being part of the relative azimuth angles stored in the sensor data storage unit 12 as the relative azimuth angle data (step S304).

The inferring unit 18 then adds the relative azimuth angle $\theta_2$ at the second point to the direction used as the basic axis of the user 3, which has been identified earlier, to infer the direction of the user 3 at the second point (step S305), and terminates the process.

Advantages of the First Embodiment

As described above, the direction inferring server 10 according to this embodiment uses the direction, which may be known by heuristics, of the user 3 at the first point to identify the direction of the user 3 at the second point, which is the location of the advertisement 5 that the user 3 has approached. Therefore, the direction inferring server 10 according to this embodiment may infer the direction of the user 3 at the second point by performing an operation on the relative azimuth angle corresponding to the first point and the relative azimuth angle at the second point, without limiting the relationship between the user 3 and the terminal apparatus 30 to a particular positional relationship.

Accordingly, even if the relationship between the user 3 and the terminal apparatus 30 is unknown, the direction inferring server 10 according to this embodiment may infer the direction of the user 3 at the second point. In addition, the direction inferring server 10 according to this embodiment may infer the direction of the user 3 at less cost than when a camera attached to the advertisement 5 is used to infer the direction of the user 3.

Furthermore, the direction inferring server 10 according to this embodiment assumes a point that satisfies a condition as a result of a travel of the user 3 that carries the terminal apparatus 30 to be the first point with reference to the direction storage unit 14, after which the direction inferring server 10 identifies the direction of the absolute direction associated with the condition as the direction of the user 3 at the first point. Accordingly, the direction inferring server 10 according to this embodiment may use a condition to which heuristics, for example, is applied to identify the direction of the user 3 at the first point, and thereby may improve precision with which the direction of the user 3 is inferred.

Second Embodiment

Although an embodiment related to the disclosed terminal apparatus has been described, the present disclosure may be embodied in various forms besides the embodiment described above. Another embodiment included in the present disclosure will be described below.

Points at which Direction is Inferred

In the first embodiment described above, an example has been described in which the direction of the user 3 at the second point at which a terminal ID was read by the read/write unit 20C is inferred. However, the direction of the user 3 at another point may also be inferred. Although, in the example in FIGS. 8 and 9, only the read/write unit 20C of the read/write units 20 has read the terminal ID, if the read/write units 20A and 20B also read the terminal ID, the direction of the user 3 in the vicinity of the advertisement 5A and 5B may be inferred. As another example, the direction inferring server 10 may also infer the direction of the user 3 at all points for which the relative azimuth angle is stored in the sensor data storage unit 12.

Position Detecting Sensors

Although, in the first embodiment described above, the IC tag 31 in the terminal apparatus 30 and the read/write unit 20 have been used to detect the position of the terminal apparatus 30, the disclosed system is not limited to this. For example, the terminal apparatus 30 may use known position detecting sensors used in GPS, dead reckoning, received signal strength indication (RSSI), and the like to detect the position of the terminal apparatus 30.

Orientation Detecting Sensors

Although, in the example in the first embodiment described above, the angular velocity sensor 33B has been used to detect the direction of the terminal apparatus 30, the disclosed terminal apparatus is not limited to this. For example, the terminal apparatus 30 may include both an angular velocity sensor and a compass sensor; to detect the absolute direction of the terminal apparatus 30, the angular velocity sensor may be used indoors as in the first embodiment and the compass sensor may be used outdoors. Insufficient indoor detection precision of the compass sensor may be thereby compensated for in the detection of the direction of the user 3.

Standalone Terminal Apparatus

Although, in the first embodiment described above, the direction inferring server 10 has inferred the direction of the user 3, the disclosed terminal apparatus is not limited to this. For example, the terminal apparatus 30 may infer the direction of the user 3 alone by incorporating functional units that provide the same functions as the sensor data storage unit 12, passage history storage unit 13, direction storage unit 14, inferred result storage unit 15, recording unit 16, identifying unit 17, and inferring unit 18 illustrated in FIG. 2 into the terminal apparatus 30.

Walking Detection

A possible method of establishing a correlation between the direction of the terminal apparatus 30 and the direction of the user 3 is to recognize the walking of the user 3 and its progress direction by using the sensor value of the acceleration sensor and save a correlation between the direction of the user 3 and the direction detected by the compass sensor in the terminal apparatus 30 at the time of the recognition. A GPS sensor may be used instead of the acceleration sensor.

When the user 3 is on an electric train or another vehicle, however, it is assumed that vertically accelerated operation is less and the user 3 proceeds in a fixed direction. In this case, it is suppress to establish the correlation between the direction of the terminal apparatus 30 and the direction of the user 3. This increases the precision with which the correlation between the direction of the user 3 and the direction of the terminal apparatus 30 is established. That is, while the user 3 is proceeding to the right or left, it is also possible not to detect the progress as walking and regard the progress direction as the direction of the user 3, suppressing the mistaken use of the wrong direction of the user 3. Even after the correlation between the direction of the user 3 and the direction of the terminal apparatus 30 has been established, if, for example, the user 3 changes the hand with which the bag is being held, the correlation becomes incorrect. When the direction of the user 3 is inferred, therefore, the most recently established correlation between the direction of the user 3 and the direction of the terminal apparatus 30 is preferably used.

As described above, a position obtained from a GPS sensor, an acceleration sensor, or another position detecting sensor is used to assume a point at which the progress direction of the user 3 may be identified from a trace of a plurality of positions to be the first point, and the progress direction of the user 3 at the first point is identified as the direction of the direction of the user 3 at the first point. Accordingly, the terminal apparatus 30 may be used as a standalone terminal apparatus that may infer the direction of the user 3.

Sequence of Basic Axis Identification

Although, in the first embodiment described above, the basic axis of the user 3 has been identified after the terminal ID had been read by the read/write unit 20, that is, the terminal apparatus 30 had reached the second point, the basic axis of the user 3 may be first identified.

Holding the Correlation

With the disclosed direction inferring server 10, when the correlation between the direction of the user 3 and the direction of the terminal apparatus 30, that is, the basic axis of the user 3 is held, it is still possible to infer the direction of the user 3 at subsequent points at which the terminal ID is read by the read/write unit 20. The direction inferring server 10 preferably holds the basic axis of the user 3 identified at the most recent first point that the user 3 has passed.

Distribution and Unification

The components of the apparatuses illustrated in FIG. 2 are not limited to the physical structures illustrated in FIG. 2. That is, the specific form of distribution or unification of the components of the apparatuses is not limited to FIG. 2; all or part of the components may be functionally or physically distributed or unified in a desired unit according to various loads and the usage situation. For example, the recording unit 16, identifying unit 17, or inferring unit 18 may be connected through a network as an external unit of the direction inferring server 10. Alternatively, the recording unit 16, identifying unit 17, or inferring unit 18 may be included in other apparatuses and these apparatuses may be mutually connected through a network to implement the functions of the direction inferring server 10.

Orientation Inferring Program

The processes described in the above embodiments may be implemented by executing a program prepared in advance on a personal computer, a workstation, or another type of computer. An example of a computer that executes a direction inferring program having the same functions as in the embodiments descried above will be described with reference to FIG. 12.

Figure 12:
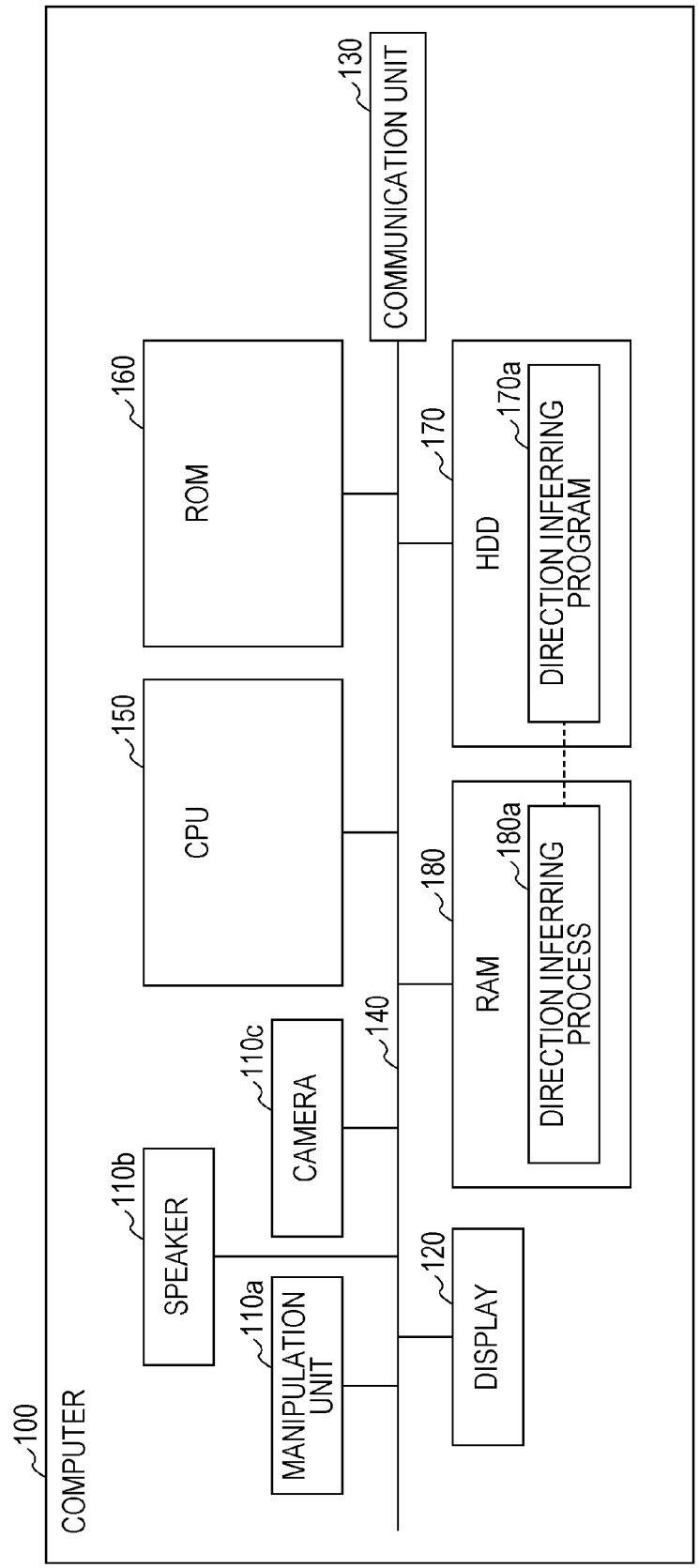
FIG. 12 illustrates an example of a computer that executes a direction inferring program according to the first embodiment and a second embodiment.

FIG. 12 illustrates an example of a computer that executes a direction inferring program according to the first embodiment and the second embodiment. As illustrated in FIG. 12, the computer 100 includes a manipulation unit 110a, a speaker 110b, a camera 110c, a display 120, and a communication unit 130. The computer 100 further includes a CPU 150, a ROM 160, a hard disk drive (HDD) 170, and a RAM 180. The manipulation unit 110a, speaker 110b, camera 100c, display 120, communication unit 130, CPU 150, ROM 160, HDD 170, and RAM 180 are mutually connected through a bus 140.

As illustrated in FIG. 12, a direction inferring program 170a, which provides the same functions as the recording unit 16, identifying unit 17, and inferring unit 18 described in the above first embodiment, is pre-stored in the HDD 170. As with the recording unit 16, identifying unit 17, and inferring unit 18 illustrated in FIG. 2, the components of the direction inferring program 170a may be appropriately unified or separated. That is, all of data to be pre-stored in the HDD 170 may not remain pre-stored in the HDD 170; only data to be used in processing may be pre-stored in the HDD 170.

The CPU 150 reads outs the direction inferring program 170a from the HDD 170 and stores the direction inferring program 170a in the RAM 180. Then, the direction inferring program 170a functions as a direction inferring process 180a, as illustrated in FIG. 12. The direction inferring process 180a reads out various types of data from the HDD 170 and appropriately stores the read-out data in an area that is allocated to the direction inferring process 180a in the RAM 180. The direction inferring process 180a executes various types of processing by using the stored data. The direction inferring process 180a includes processes executed by the recording unit 16, identifying unit 17, and inferring unit 18 illustrated in FIG. 2, that is, for example, the processes illustrated in FIGS. 10 and 11. All processing units to be virtually implemented by the CPU 150 may not operate on the CPU 150; only processing units to be used for processing may be virtually implemented.

The direction inferring program 170a described above may not be pre-stored in the HDD 170 or ROM 160 from scratch in some cases. For example, programs may be pre-stored on a so-called flexible disk (FD), a compact disk-read-only memory (CD-ROM), a digital versatile disk (DVD), a magneto-optical disk, an integrated circuit (IC) card, or another portable physical medium that may be inserted into the computer 100. Then, the computer 100 may acquire these programs from the portable physical medium and may execute the acquired programs. Alternatively, programs may be pre-stored in, for example, another computer or a sever connected to the computer 100 through a public line, the Internet, a local area network (LAN), a wide area network (WAN), or the like. The computer 100 may then acquire these programs from the other computer or server and may execute the acquired programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of inferring a user's absolute direction by a computer, the method comprising:
   recording relative azimuth angles, obtained from an output of a direction sensor included in a terminal apparatus carried by the user, in a plurality of timings including timings corresponding to a first point and a second point different from the first point;
   identifying the user's absolute direction at the first point at which a predetermined condition is met; and
   inferring the user's absolute direction at the second point by using the relative azimuth angle corresponding to the first point, the relative azimuth angle corresponding to the second point, and the user's absolute direction that has been identified at the first point.

2. The method according to claim 1, wherein as the identifying of the user's absolute direction at the first point, the computer references a recording unit that stores conditions under which the user's direction is identified, each condition being associated with an absolute direction in which the user is identified as facing when the each condition is satisfied, and identifies the absolute direction as the user's direction at the first point based on a result of a travel of the user that carries the terminal apparatus.

3. The method according to claim 1, wherein as the identifying of the user's absolute direction at the first point, the computer assumes a point at which a travelling direction of the user is capable of being identified from a trace of a plurality of positions to be the first point and identifies the travelling direction of the user at the first point is identified as the user's direction at the first point, by using a position detecting sensor that detects the user's direction at the first point.

4. A direction inferring apparatus comprising:
   a recording unit configured to record relative azimuth angles, obtained from an output supplied from a direction sensor included in a terminal apparatus carried by a user, in a plurality of timings including timings corresponding to a first point and a second point different from the first point;
   an identifying unit configured to identify a user's absolute direction at the first point at which a predetermined condition is met; and
   an inferring unit configured to infer the user's absolute direction at the second point by using the relative azimuth angle corresponding to the first point, the relative azimuth angle corresponding to the second point, and the user's absolute direction that has been identified at the first point.

5. A terminal apparatus comprising:

a direction sensor configured to measure relative azimuth angles of the terminal apparatus;

a recording unit configured to record relative azimuth angles, obtained from an output supplied from a direction sensor included in a terminal apparatus carried by a user, in a plurality of timings including timings corresponding to a first point and a second point different from the first point;

an identifying unit configured to identify a user's absolute direction at the first point at which a predetermined condition is met; and an inferring unit configured to infer the user's absolute direction at the second point by using the relative azimuth angle corresponding to the first point, the relative azimuth angle corresponding to the second point, and the user's absolute direction that has been identified at the first point.

* * * * *